United States Patent
Hagiwara et al.

(10) Patent No.: US 6,697,693 B2
(45) Date of Patent: Feb. 24, 2004

(54) PRODUCT DEVELOPMENT SYSTEM USING COMMON FORMAT DATA

(75) Inventors: Kazuhiko Hagiwara, Nagoya (JP); Keita Satou, Chiryu (JP); Akihito Iwai, Chiryu (JP); Hiroshi Shibata, Kariya (JP)

(73) Assignee: Denso Corporation, Aichi-pref. (JP)

( * ) Notice: Subject to any disclaimer, the term of this patent is extended or adjusted under 35 U.S.C. 154(b) by 117 days.

(21) Appl. No.: 10/115,568

(22) Filed: Apr. 4, 2002

(65) Prior Publication Data

US 2002/0147612 A1 Oct. 10, 2002

(30) Foreign Application Priority Data

Apr. 4, 2001 (JP) ........................................ 2001-105876

(51) Int. Cl.[7] .............................................. G06F 19/00
(52) U.S. Cl. ........................ 700/117; 700/181; 700/5; 709/100
(58) Field of Search ............................ 700/89, 96–97, 700/117, 181, 100, 182, 245, 5, 107; 709/100, 101, 319; 716/11

(56) References Cited

U.S. PATENT DOCUMENTS 5,552,995 A * 9/1996 Sebastian ..................... 700/97
5,699,242 A * 12/1997 Togawa et al. .............. 700/5
5,761,093 A * 6/1998 Urbish et al. ................ 700/107
5,883,805 A * 3/1999 Sada ............................ 700/100

FOREIGN PATENT DOCUMENTS

| JP | 10-335193 | 12/1998 |
| JP | 2000-99512 | 4/2000 |
| JP | 2001-22567 | 1/2001 |

* cited by examiner

Primary Examiner—Leo Picard
Assistant Examiner—Kidest Bahta
(74) Attorney, Agent, or Firm—Nixon & Vanderhye

(57) ABSTRACT

In a car development system, a control specification development computer transmits Excel-format matching data of a car manufacturer to an XML database computer of an ECU supplier. The XML database computer converts the Excel-format data to XML-format data, and stores the data into an XML database. A software development computer of the ECU supplier requests text-format matching data, and the XML database computer extracts the matching data from the XML database, converts the data to text-format data and then transmits the data to the software development computer. A matching computer of the car manufacturer can likewise store ASAP2-format data into the XML database computer or extract the data from the XML database computer.

9 Claims, 8 Drawing Sheets

PRODUCT DEVELOPMENT SYSTEM USING COMMON FORMAT DATA

CROSS REFERENCE TO RELATED APPLICATION

This application is based on and incorporates herein by reference Japanese Patent Application No. 2001-105876 filed on Apr. 4, 2001.

FIELD OF THE INVENTION

The present invention relates to a product development system, which may be used in designing and manufacturing cars.

BACKGROUND OF THE INVENTION

Various products are designed and manufactured through joint work among a final product manufacturer and many part suppliers. In designing and manufacturing cars for instance, a process of tuning the values of matching data used for control in accordance with the characteristic of each engine or car is contained in the development of a power train control system for cars, and this process is called as matching process. Alteration/adjustment of various numerical values in conformity with the inherent properties of each engine is called as matching, and technical experts who perform this work are called as matching experts. The values to be adjusted are called as matching data.

Figure 10:
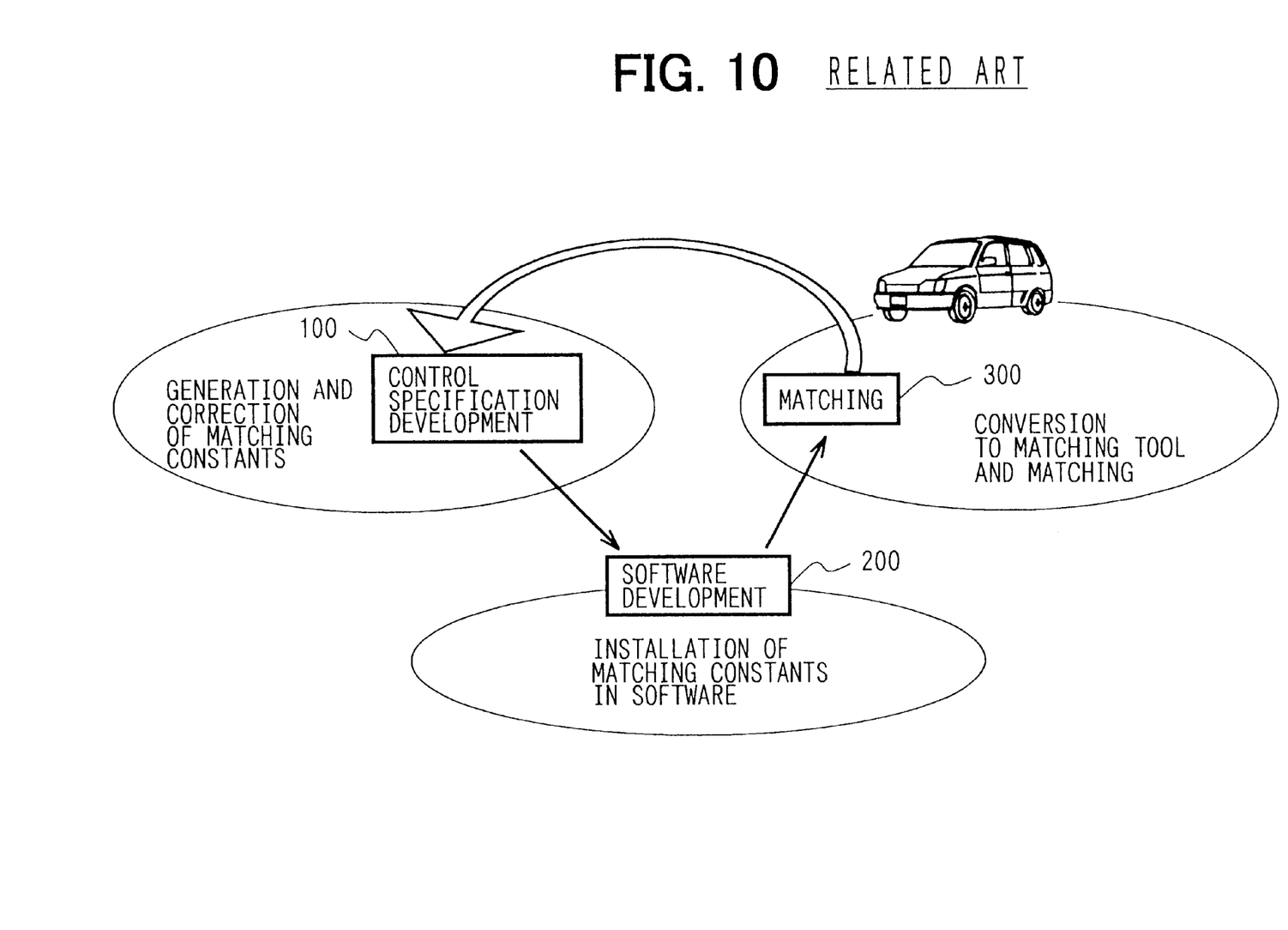
FIG. 10 is a schematic diagram showing a car development system in a related art.

As shown in FIG. 10, the matching process comprises (1) a control specification development process 100, (2) a software development process 200 and (3) a matching process 300, and these steps are repetitively carried out to adjust matching data and determine matching data which are finally used by an electronic control unit (ECU) for a product car. Generally, the control specification development process and the matching process 300 are performed in a car manufacturer, while the software development process 200 is performed in an ECU supplier. Accordingly, the matching process accounts for high percent in the power train control system development process.

Figure 11:
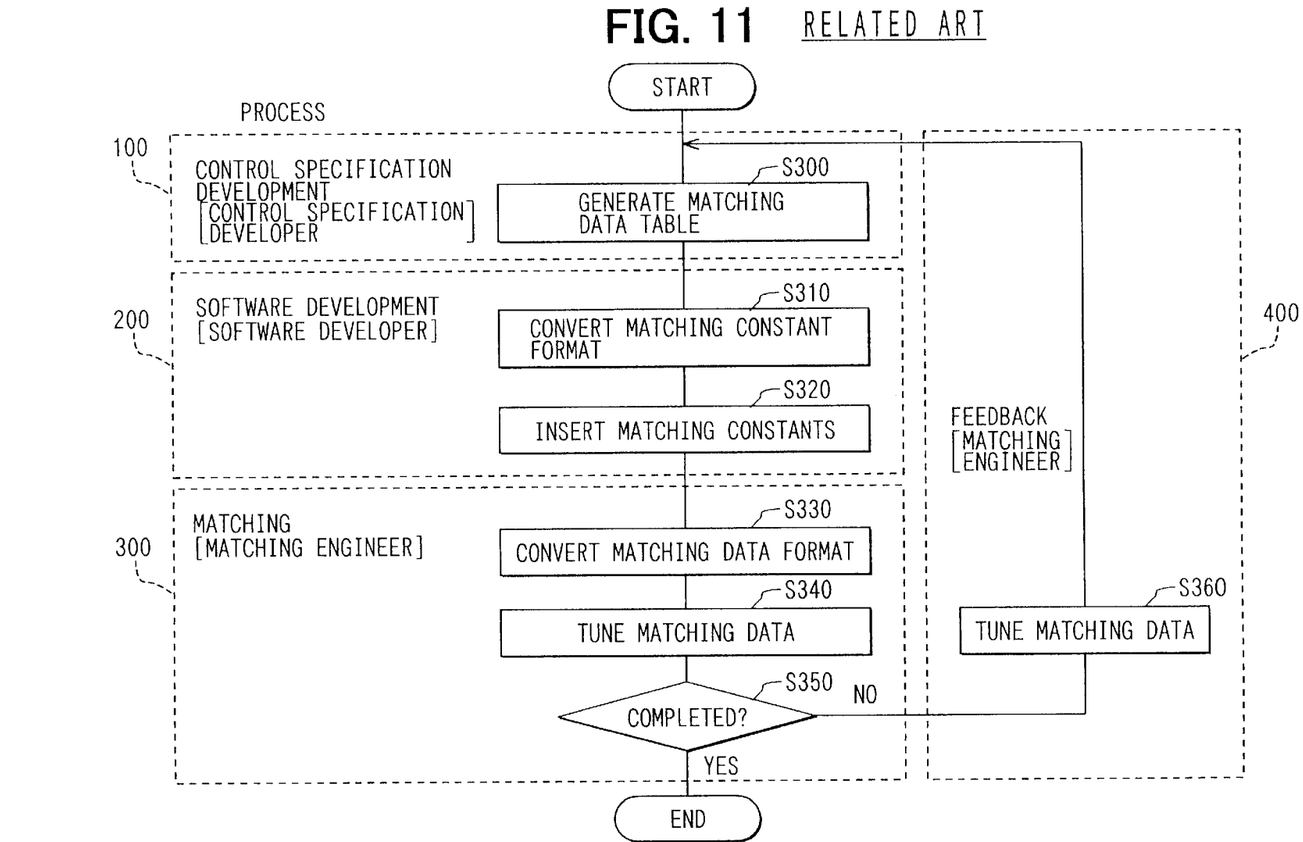
FIG. 11 is a diagram showing a matching process, etc. in the related art.

Specifically, a control specification developer inputs matching data into a sheets of spreadsheet software or the like while referring to past matching data to generate a matching data table (control specification) as shown in FIG. 11. The matching data thus achieved are printed on a sheet or recorded in a recording medium in a data format inherent to the spreadsheet software, for example, in Excel format (S300). Subsequently, the control specification developer delivers the sheet thus printed or the recording medium to a software developer.

When the matching data are supplied in the form of a sheet, the software developer inputs the data printed on the sheet in a text format by using a keyboard or the like so that the data can be inserted into software to be developed, whereby the data are inserted into the software. On the other hand, when the data are supplied in the form of a recording medium, the format inherent to the spreadsheet software recorded in the recording medium is converted to a CSV file by using a conversion tool on a computer (S310), converted in the text format and inserted into software to be developed, for example, described in C language (S320). Thereafter, the software generated is recorded in a recording medium and delivered to a matching expert.

The matching expert converts the matching data inserted in the software recorded in the recording medium to data having a data format, for example, ASAP format so that the matching data can be read out by a matching tool in a computer or a dedicated device (S330), input to the matching tool of the computer or the dedicated device, and adjust the matching data while operating a car or engine (S340). Then, the matching expert determines whether the operation state of the car or engine based on the matching data reaches a target value or not. If it reaches the target value (S350:YES), the matching process is completed and shifted to a next step. On the other hand, if tuning is further needed (S350:NO), the adjusted matching data are converted in the format of the matching data table, recorded in a recording medium and delivered to the control specification developer. That is, the process returns to the step of S300.

For example, when matching of a fuel injection amount as a specific example of the matching process is considered, the above steps are repetitively carried out until matching data such as an injection amount at starting, an injection amount after starting, a fuel cut-off return correction value, etc. out of injection amounts matched with the characteristics of an engine reach target values of fuel, an exhaust gas restrain value, etc. In this case, it is required to set respective matching data in accordance with each of conditions such as engine cooling water temperature, etc. That is, the matching data must be set in accordance with various control targets and various conditions, and many kinds of data must be delivered among these researchers at many times.

However, such matching data are tuned in the matching step, and then fed back to the control specification development step. This development loop is repeated many times. Further, the matching data are needed to be set in accordance with various control targets and various conditions. Therefore, if the data are manually input through a keyboard or the like, the development efficiency would be remarkably low. It may occur that an incorrect control specification or software would be prepared due to an input mistake. Further, even when a conversion tool is used, the development efficiency would be low if data conversion is carried out every step. Besides, the data format is usually different among manufacturers and the developer must use a conversion tool (converter) which is in conformity with each data format of matching data received in the previous step. When the data format is different among manufacturers, the development and maintenance of conversion tools are required to be individually performed every data format.

SUMMARY OF THE INVENTION

The present invention therefore has an object to provide a product development system which can enhance the working efficiency of a matching process and shorten a development term.

According to the present invention, matching data having an application-inherent format which are generated by the respective applications of a control specification development system, a control program development system and a matching system are stored in a common format in a storage means. Further, the matching data thus stored in the common format are retrieved in an application-inherent format from any of the control specification development system, the control program development system and the matching system.

Accordingly, a developer (technical expert) using each system can handle matching data with paying no attention to which format the application-inherent format corresponds. The common format may be XML or the like as a format with which data can be associated with one another through a link, whereby respective matching data or both of matching data and other data can be easily stored in correlation with one another.

Preferably, in response to a request from each system through a network, attendant data to matching data of the common format are stored in correlation with the matching data, and the attendant data thus stored are transmitted in response to a request from each system. At this time, the attendant data may be transmitted in the common format, or converted in an application-inherent format of a system making the request through conversion means and then transmitted.

As the attendant data, information which can serve as a technological basis of the matching data is used. As such information may be used a logical equation needed to actuate an engine, a manner of reducing the equation to a logic which can be implemented by a commercially-usable microcomputer control device, a matching method when a theoretical estimation cannot be performed, etc. In the matching process, matching data for controlling a device using chemical reactions such as an engine is adapted, so that a large amount of theoretical estimation is not implemented. Accordingly, the know-how of such a matching work is accumulated as a developer's know-how. However, the matching data and the know-how can be stored in correlation with each other.

A restriction value of the matching data according to is considered as an example of such attendant data. That is, for a prototype engine or car produced at the stage of the development, an experienced technical expert carries out a matching work so that the prototype engine or car is not broken down because it is very expensive. However, if such a restriction value is stored in association matching data and the matching data are stored based on the restriction value, the break-down of the prototype engine or the like can be surely prevented. Storing the matching data in the storage means based on the restriction value means, for example, a case where the restriction value is stored in correlation with the matching data. At the transmission time of the matching data, the matching data are added with the restriction value and then transmitted to each system to thereby inform the restriction value to the developer of each system.

Thus, the matching data based on the restriction value are input and stored, a case where when the matching data are stored in the storage means, the conversion means or the storage means checks whether the matching data exceeds the restriction value. If it exceeds the restriction value, the matching data is automatically converted within the restriction value and stored, a case where if the matching data exceeds the restriction value, a warning is transmitted to a transmission source system so that each system makes a correction, etc.

Progress information may be contained as an example of the attendant data. The progress information is information containing the rate of advance in the matching process. The rate of completion may be stored as progress information every time the work of each step is completed. Although the developments in the prior art have been made while shared into respective parts of the control specification development, the developer of each step can easily grasp the progress.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to an embodiment which is directed to a car development, which is assumed to be performed as a joint work of a car manufacturer and a part supplier.

Figure 1:
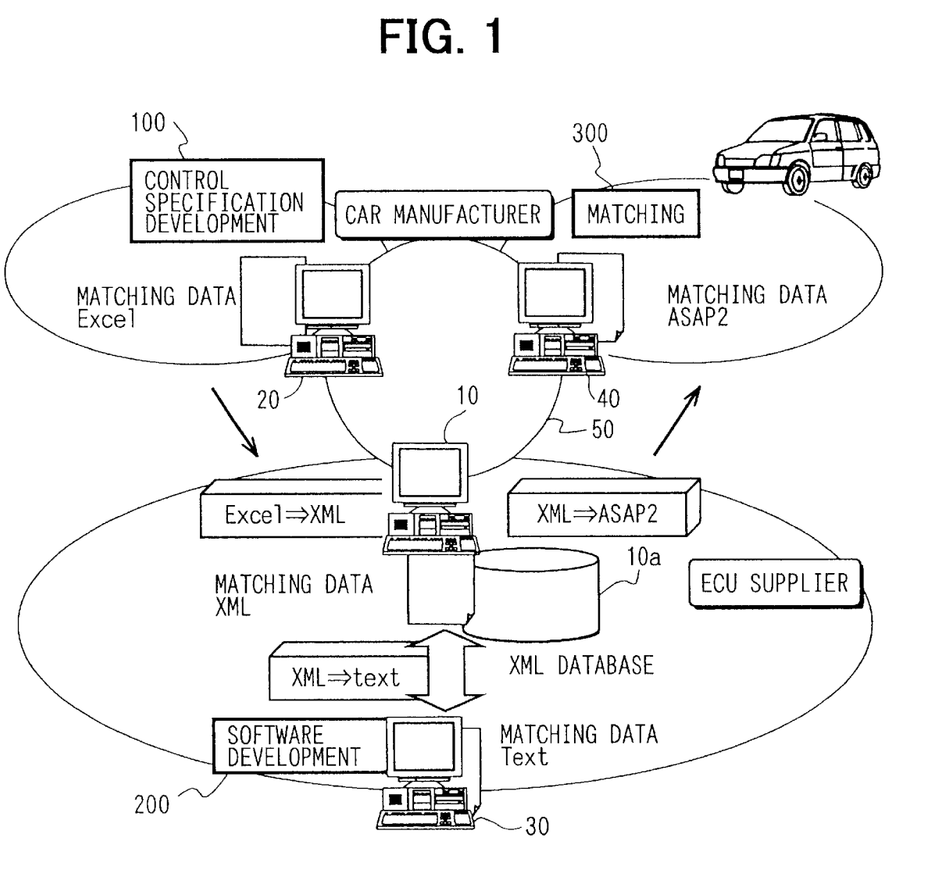
FIG. 1 is a schematic diagram showing a car development system according to an embodiment of the present invention.

Referring first to FIG. 1, a car development system has a computer 10 for XML database, a control specification development computer 20, a software development computer 30 and a matching computer 40 which are respectively connected to a network 50.

The control specification development computer 20 is for a control specification development process 100 performed by control specification developers of a car manufacturer, and the matching computer 40 is for a matching process 300 performed by matching technical experts of the car manufacturer. The software development computer 30 is for a software development process performed by software developers in a manufacturer of ECU (electronic control units) for cars, that is for an ECU supplier.

The XML database computer 10 has a server function mounted at the ECU supplier side. It has an XML database 10a. The XML database computer 10 has a function of converting information input through the network 50 to information having an XML format and then storing the information thus converted into the XML database 10a. Further, it has a function of converting the information having the XML format extracted from the XML database 10a to information having a requested format and transmitting the information concerned in response to a request input through the network 50.

The XML database computer 10, the control specification development computer 20, the software development computer 30 and the matching computer 40 are respectively general personal computers, and each of them is equipped with CPU, ROM, RAM, I/O, etc. A hard disc, a display, a keyboard, a mouse, various input/output devices, etc. are connected to I/O. Further, OS and various applications are installed in each computer. For example, a spreadsheet software for development a matching data table is installed in the control specification development computer 20, and a development software such as a C compiler, an assembler, a linker or the like is installed in the software development computer 30.

In the matching computer 40 are installed matching tools such as a simulation software for inputting matching data to simulate an engine or car, a software for controlling a dedicated device for controlling an actual engine or car and achieving the state thereof to perform matching, etc.

Next, the flow of the matching process using the car development system and the processing of each computer will be described with reference to FIG. 2.

The control specification developer of a car manufacturer input matching data into a spreadsheet software to be executed by the control specification development computer 20, and generates a matching data table. When the input of the matching data is completed, the matching data table is preserved in the file format of the spreadsheet software (Excel format). The control specification developer inputs from a keyboard or the like an instruction to store the file of the Excel format into the XML database 10a. When detecting the input of this instruction, the control specification development computer 20 transmits the Excel-format file through the network 50 to the XML database computer 10.

The XML database computer 10 receives this file from the control specification development computer 20, converts the file to the XML-format data, and then stores the data into the XML database 10a. The contents which have been carried out to this step correspond to the processing of S100 of FIG. 2.

When an instruction to retrieve matching data from the XML database 10a is input to the software development computer 30 by the software developer in the software development process 200, the software development computer 30 requests matching data of the text format to the XML database computer 10. The XML database computer 10 extracts the matching data from the XML database 10a in response to this request, converts the matching data to text-format data, and then transmits the data to the software development computer 30.

The software development computer 30 receives the text-format matching data, and stores them into the storage means thereof. The software developer inserts the text-format matching data into a source code of a program to be developed, and carries out compile, link, etc. to generate a control program of ECU. The contents which have been carried out to this step corresponds to the processing of S110 of FIG. 2. The control is program thus generated is built in ECU, and used for adjustment of the matching data in the next step.

When receiving a notification of completion of the development from the software developer, a matching expert inputs to the matching computer 40 an instruction to retrieve the matching data from the XML database 10a. When input to this instruction, the matching computer 40 requests matching data of ASAP2 format to the XML database computer 10.

In response to this request, the XML database computer extracts the matching data requested from the XML database 10a, converts the matching data to ASAP2-format data and then transmits the data to the software development computer 30. The matching computer 40 receives the ASAP2-format matching data, and stores the data into the storage means thereof. The matching expert reads out the ASAP2-format matching data by a matching tool, and adjusts the matching data by using the matching tool while operating the car or engine (containing ECU).

When the adjustment is completed by the matching tool, the matching expert inputs a data storing instruction to the matching computer 40. When detecting the input of this instruction, the matching computer 40 transmits the ASAP2-format matching data through the network 50 to the XML database computer 10.

The XML database computer 10 receives the ASAP2-format matching data from the matching computer 40, converts the matching data to XML-format data and then stores the data into the XML database 10a. The contents which have been carried out to this step corresponds to the processing of S120 of FIG. 2.

When the matching result reaches a target value (S130:YES), the matching step is completed, and the processing proceeds to a next step. On the other hand, if a further adjustment is needed (S130:NO), the processing returns to the control specification development of S100.

The above steps and the processing of each computer are carried out until the adjustment is completed as described above.

When the adjustment is completed (S130:YES), the matching computer 40 transmits a development completion notification to each computer of the XML database computer 10, the control specification development computer 20 and the software development computer 30. Each computer receives this development completion notification and informs it to each developer, etc.

Figure 3:
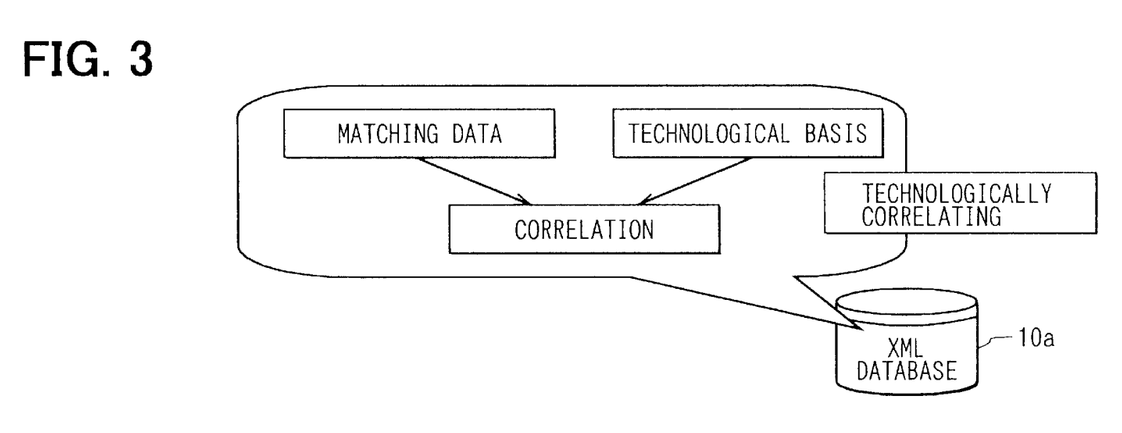
FIG. 3 is a diagram showing data correlation executed in the embodiment.

Further, the XML-format matching data of the XML database 10a can be stored in correlation with various kinds of information. That is, when some car is developed, there exist matching data corresponding to data for controlling the car and technical information considered to generate the data. As shown in FIG. 3, the matching data can be stored in the XML database 10a in correlation with the information which serves as the technological basis relating to the matching data as described above. For example, as the information serving as the technological basis may be considered in formation on a theoretical equation serving as a base to start an engine, a manner of reducing the equation to a logic which can be implemented by a commercially-usable microcomputer controller, a matching method when the theoretical estimation is not implemented, etc. These pieces of information may be stored in correlation with the matching data through a link.

The information on the technological basis correlated as described above can be retrieved and used. For example, in the matching of S120 of FIG. 2, the matching expert carries out matching by using a matching tool as described above. At this time, a browser is started in the matching computer 40 to access the XML database computer 10. When detecting an access by the browser, the XML database computer 10 returns page information for promoting an input of a searching key for the matching data. The browser of the matching computer 40 displays a page in accordance with this information, and the matching experts inputs the searching key for matching data required into the page thus displayed. The browser transmits the input searching key to the XML database computer 10, and the XML database computer 10 receives this searching key.

The XML database computer 10 extracts and returns the information serving as the technological basis on the corresponding matching data from the XML database 10a by using the searching key thus received. Accordingly, the information indicating the technological basis of the matching is displayed on the browser of the matching computer 40. The extraction is performed by using a link for the matching data and the technological basis. As described above, the matching expert can perform the matching by using the information indicating the technological basis (a technical proof, know-how of data setting).

In the case where the application-inherent format is a link-embedding format, when matching data are transmitted, a link to information serving as such a technological basis as described is converted while it is contained in the matching data, and then transmitted to each computer. Accordingly, by merely clicking the link in the matching data, the browser is automatically started, and the searching key contained in the link is transmitted, so that attendant data such as the corresponding technological basis, etc. are displayed on the browser.

Figure 4:
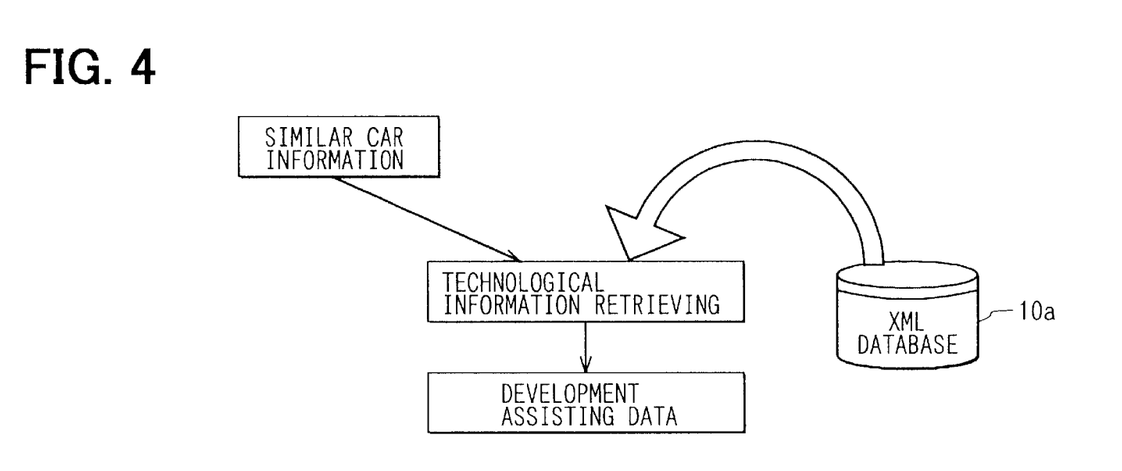
FIG. 4 is a diagram showing use of similar car information in the embodiment.

When a matching expert makes an experiment by using a matching tool to adjust the matching data to data which are conformed with a car, the matching expert can search development assisting data as shown in FIG. 4 (a range of matching data in which no car is broken down, a range of matching data in which the performance can be brought out, a value (mode) set for the engine concerned in a largest number of cars, etc.) from data of similar past-developed cars which exist in the XML database 10*a*, and display the data on the matching computer 40. Further, by using these data, an input assisting function of merely inputting the range of the restriction values thereof may be provided to a tool for inputting the matching data, for example, whereby abnormal data can be prevented from being input, and the development efficiency can be enhanced.

When new information is added to the XML database 10*a*, a data addition page of the XML database computer 10 is accessed from a browser of the matching computer 40, and information on the technological basis and a key of matching data are carried out from a form. The XML database computer 10 correlates the matching data corresponding to the key and the information on the technological basis input to the form with a link and stores them into the XL database 10*a*. As described above, the information associated with the matching data can be suitably stored in the XML database 10*a*. When the application-inherent form is the link-embedding format, the XML database computer 10 stores a link contained in the application-inherent format as a link of XML into the XML database 10*a* when application-inherent format matching data are converted to XML-format data. Information of a link destination is also received and converted to XML-format data, and stored in the XML database 10*a*.

The attendant data such as the information on the technological basis as described above can be likewise added or referred to by a control specification developer and a software developer.

Figure 5:
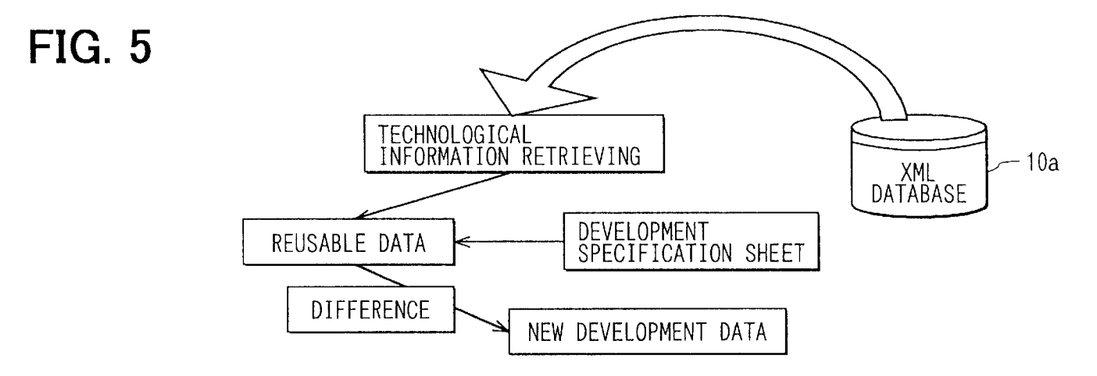
FIG. 5 is a diagram showing reuse of data in the embodiment when a new car is developed.

When a new car is developed, the control specification developer searches information on past-developed cars from the XML database 10*a* in the same manner as described above, and retrieves from the XML database 10*a* the matching data of a car which is most similar to the car to be developed at this time to add the matching data to a control specification or use it as a model of the matching data of the new car. At this time, the difference between the similar car and the data of the car to be newly developed is detected (through well-known processing executed, in the drawing, in a technical information searching means portion), and a part to be newly developed and a part to be reusable can be clearly discriminated from each other. As described above, a differential management can be performed and thus the development efficiency and the quality can be enhanced.

Figure 2:
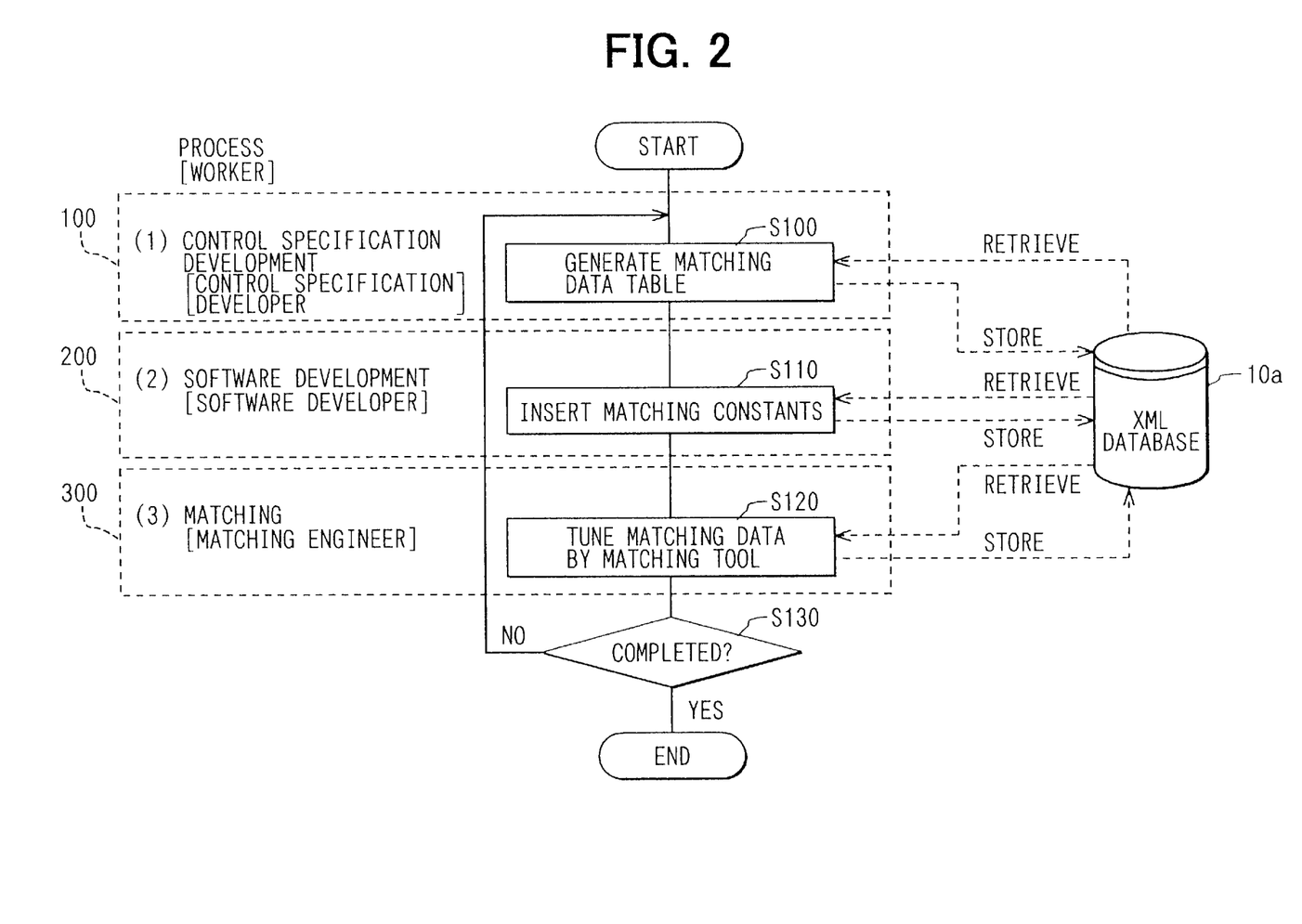
FIG. 2 is a diagram showing a matching process, etc. executed in the embodiment.

When an instruction to retrieve matching data from the XML database 10*a* is input to the control specification development computer 20 by the control specification developer in S100 of FIG. 2, the control specification development computer 20 requests Excel-format matching data to the XML database computer 10. In response to this request, the XML database computer 10 extracts the matching data from the XML database 10*a*, converts the data to the Excel-format data and then transmits the data to the control specification development computer 20. The control specification development computer 20 receives the Excel-format matching data and stores the data into the storage means thereof. By using this matching data, the control specification developer can generate new matching data.

As described above, the matching data received by the XML database computer 10 are stored in the XML database 10*a* while being converted to the XML-format data, and the matching data requested from each computer are extracted from the XML database 10*a*, converted to data-format (format) data requested and then transmits the data. Thus, the data delivery among the respective steps can be smoothly performed. That is, each developer (technical expert) is not required to pay attention to the difference in data format, and no time is wasted to perform the conversion processing in the self-system and also to familiarize the conversion working method every data format.

As described above, the past matching data and the technical materials indicating the basis thereof (for example, technical materials for reviews on matching data for low emission), and other additive information (for example, a measurement pattern for 10 mode running) are stored in correlation with one another into the XML database 10*a* by using XML. Thus, the matching expert can reuse knowledge of records of past, etc. and advance the developments efficiently.

By providing the XML database computer 10 at the ECU supplier side, it is unnecessary to manage the matching data at the car manufacturer side, and the matching data can be achieved through the network 50 if necessary. The matching data can be achieved at any time for 24 hours by operating the XL database computer 10 without stopping the XL database computer 10.

Figure 6:
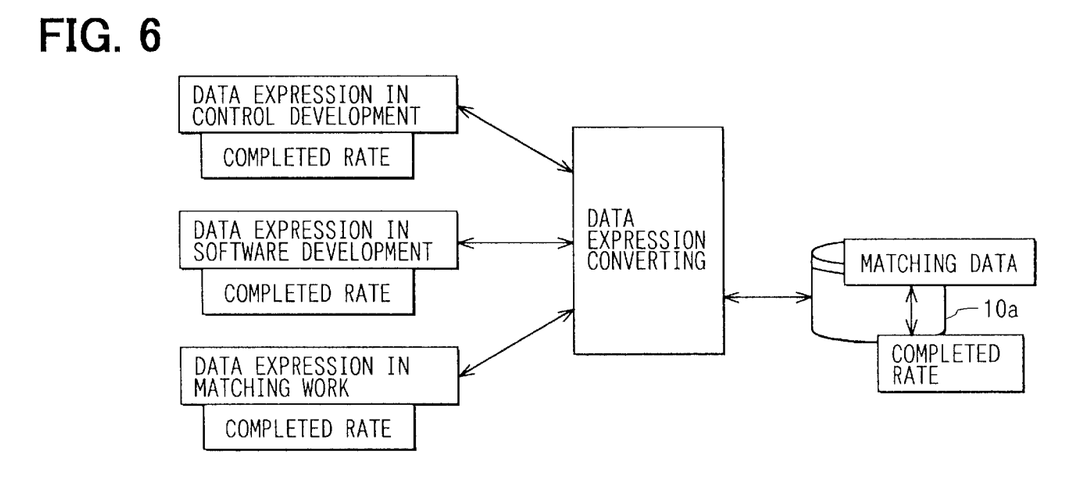
FIG. 6 is a diagram showing a progress management of a project in the embodiment.

Further, a completion rate indicating the rate of the completion of the work in each step is transmitted as attendant data to the XML database computer 10 together with the matching data and the other attendant data (data expression in FIG. 6), and stored in the XML database 10*a* as shown in FIG. 6. It is difficult to grasp the status of each of the works of the control specification development, the software development and the matching because these works are separately performed every part. However, if the matching data and the completion rate are associated with each other every time the work of each step is completed or every time the matching data are stored, the progress of the project can be managed on a result basis.

When it is inquired from the computer of each developer to the XML database computer 10 whether the specification development, the software development and the matching are completed, the XML database computer 10 extracts the progress information (completed rate) on the indicated matching data from the XML database 10*a*, and returns it to a request-making computer. Accordingly, the progress status of the projection can be displayed on each computer, and the project management containing the grasp of the progress can be easily performed.

Figure 7:
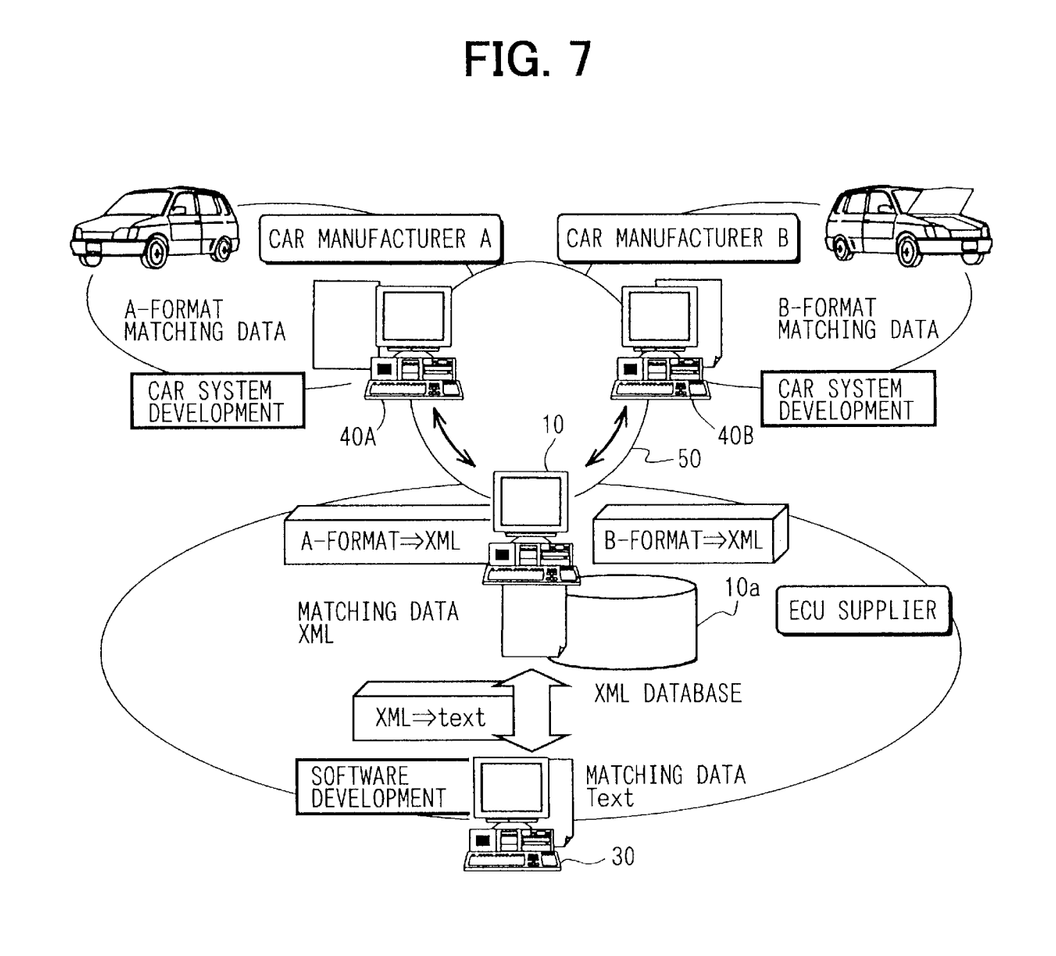
FIG. 7 is a schematic diagram showing when developments are made between manufacturers using different formats.
Figure 8:
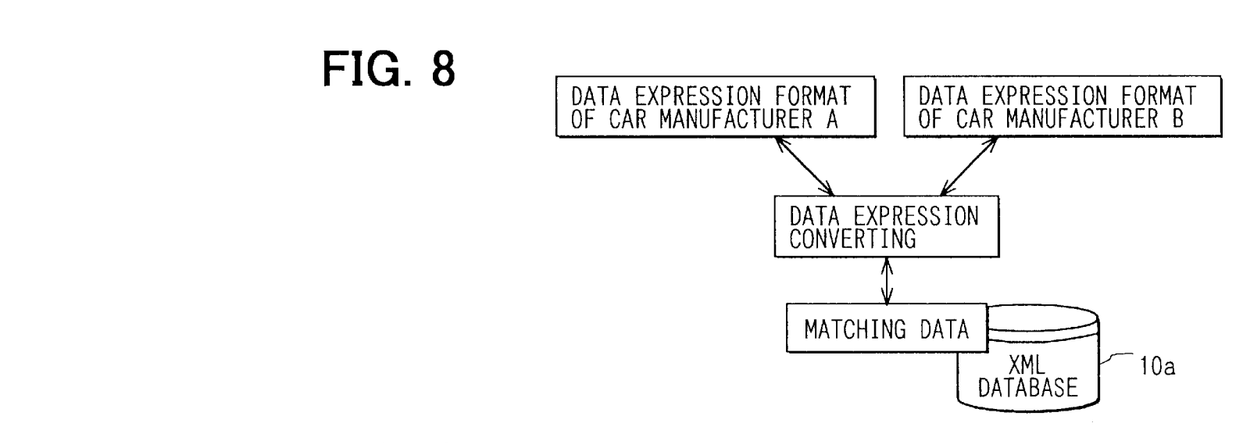
FIG. 8 is a diagram showing a data conversion in the embodiment when data expression formats are different.

According to the car development system described above, as shown in FIGS. 7 and 8, even when the format of the matching data varies from car manufacturer to car manufacturer, the data can be managed as the XML-format data in the XML database 10a. In this system of FIG. 10, an A-format matching data for a car manufacturer A and a B-format matching data for a car manufacturer B are owned by the ECU supplier. That is, even when the essential meaning of the matching data is the same, the data expression format is varied from car manufacturer to car manufacturer. For example, there is a case where the car manufacturer A uses the Excel format, however, the car manufacturer B uses the Word format. However, according to the car development system of this embodiment, the data can be collectively managed by storing the data in a standard common XML format in the XML database 10a, and the management cost imposed on the ECU supplier can be reduced. That is, the matching data held in the XML database 10a can be supplied to a car manufacturer while the format of the matching data is converted.

In this embodiment, the XML database computer 10 is equipped at the ECU supplier side. However, it may be equipped at the car manufacturer side. Further, the control specification development computer 20 and the matching computer 40 are assumed as computers used by developers (technical experts) of car manufacturers. However, it may be assumed that the car manufacturers perform only the matching. Further, the function of the XML database computer 10 may be equipped to at least one computer of the control specification development computer 20, the software development computer 30 and the matching computer 40.

With respect to the control specification development computer 20, the software development computer 30 and the matching computer 40, a plurality of computers may be respectively equipped. The XML database 10a can consist of a plurality of computers.

Figure 9:
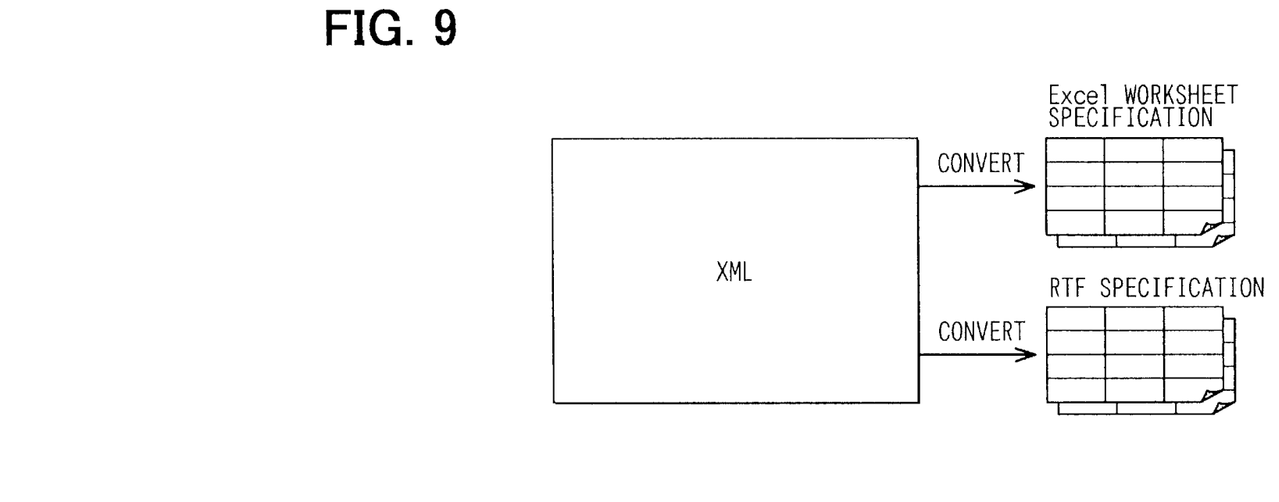
FIG. 9 is a diagram showing a conversion modification of the data expression format in the embodiment.

The conversion between the matching data format and the XML format in each step is carried out by the XML database computer 10, however, the conversion function may be equipped to at least one computer of the control specification development computer 20, the software development computer 30 and the matching computer 40 (40A and 40B). For example, XML-based matching data may be converted to Excel worksheet by using VBA macro or the like, or to Word table through RTF format (FIG. 9).

Further, a computer for conversion may be connected to the network 50 so that the conversion function described above is implemented by the conversion computer. In this case, for example, the conversion computer may convert the Excel-format data received from the control specification development computer 20 through the network 50 to XML-format data, and then transmitted to the XML database computer 10. The data transmitted from the software development computer 30, the matching computer 40 are likewise converted and transmitted to the XML database computer 10. When the Excel-format matching data are read out by the control specification development computer 20, the following may be carried out. For example, the control specification development computer 20 requests the Excel-format matching data to the conversion computer, and in response to this request the conversion computer requests the corresponding XML data to the XML database computer 10.

In response to this request, the XML database computer 10 extracts XML data and transmits the data to the conversion computer. The conversion computer receives the XML data, converts the data to the Excel-format data and then transmits the data to the control specification development computer 20.

In the above-described embodiment, the network 50 may be the Internet, or an exclusive line. In the case of the Internet, data to be communicated may be enciphered and then communicated.

What is claimed is:

1. A product development system comprising:
   a product specification development system for developing a product specification containing matching data which are data as a matching target in a matching process of a product development;
   a program development system for developing a program of an electronic control unit for a product based on the matching data;
   a matching system for matching the matching data based on the status of a prototype controlled by the electronic control unit for product which is mounted in the prototype;
   conversion means which are accessible from the specification development system, the program development system and the matching system; and
   storage means for storing data of a common format,
   wherein the specification development system, the program development system and the matching system are connected to a network,
   wherein the conversion means, when receiving matching data of a format inherent to an application used in each system from the specification development system, the program development system and the matching system, converts the matching data of the format inherent to the application concerned to the matching data of the common format, and stores into the storage means the matching data of the common format after the conversion, and
   wherein the conversion means, when receiving a request for matching data of a format inherent to an application from the specification development system, the program development system and the matching system, extracts the corresponding matching data of the common format from the storage means, converts the matching data of the common format thus extracted to the matching data of the format inherent to the application concerned, and transmits the same to a system serving as a request source.

2. The product development system as in claim 1, wherein the specification development system is for developing a control specification of a car, the program development system is for developing a control program of the electronic control unit for the car including an engine.

3. The product development system as in claim 1, wherein the storage means has a function of storing attendant data to the matching data concerned in the common format in correlation with the matching data of the common format in response to a request from the specification development system, the program development system and the matching system, and has a function of transmitting the attendant data thus stored to a request source.

4. The product development system as in claim 3, wherein the attendant data are information corresponding to a technological basis of the matching data.

5. The product development system as in claim 3, wherein the attendant data contains a restriction value of the matching data, and the matching data is stored in the storage means based on the restriction value.

6. The product development system as in claim 3, wherein the attendant data contains progress information on the matching data.

7. The product development system as in claim 6, wherein a development process in each system of the specification development system, the program development system and the matching system is completed, the rate of the completion is stored as the progress information into the storage means.

8. The product development system as in claim 1, wherein the data of the common format stored in the storage means are supplied.

9. The product development system as in claim 1, wherein the specification development system and the matching system are provided in a product manufacturer, and the conversion means with the storage means and the program development system are provided in a supplier of the electronic control unit.

\* \* \* \* \*